US009507038B2

(12) United States Patent
Richelmi et al.

(10) Patent No.: US 9,507,038 B2
(45) Date of Patent: Nov. 29, 2016

(54) PNEUMATIC CONTROL FOR MARINE SEISMIC SOURCE AND METHOD

(71) Applicant: SERCEL, Carquefou (FR)

(72) Inventors: Dorian Richelmi, Saint Maximin la Sainte Baume (FR); Frederic Sautron, Hyères (FR)

(73) Assignee: SERCEL, Carquefou (FR)

( * ) Notice: Subject to any disclaimer, the term of this patent is extended or adjusted under 35 U.S.C. 154(b) by 0 days.

(21) Appl. No.: 14/576,624

(22) Filed: Dec. 19, 2014

(65) Prior Publication Data

US 2015/0378037 A1 Dec. 31, 2015

Related U.S. Application Data

(60) Provisional application No. 62/018,876, filed on Jun. 30, 2014.

(51) Int. Cl.
*G01V 1/38* (2006.01)
*G01V 1/133* (2006.01)
*G01V 1/137* (2006.01)
*G01V 1/147* (2006.01)
*G01V 1/00* (2006.01)

(52) U.S. Cl.
CPC ............... *G01V 1/147* (2013.01); *G01V 1/137* (2013.01)

(58) Field of Classification Search
CPC ......... G01V 1/133; G01V 1/137; G01V 1/02
USPC ........ 181/121, 119, 120, 118, 117, 116, 113; 367/144, 142, 141
See application file for complete search history.

(56) References Cited

U.S. PATENT DOCUMENTS

| | | | | |
|---|---|---|---|---|
| 2,083,976 A | * | 6/1937 | Armstrong | F42B 3/06 102/329 |
| 3,041,970 A | * | 7/1962 | Foster | F42B 3/06 102/330 |
| 3,322,232 A | * | 5/1967 | Chalmers | G01V 1/137 181/120 |
| 3,379,273 A | * | 4/1968 | Chelminski | G01V 1/137 181/118 |
| 3,638,752 A | * | 2/1972 | Wakefield | G01V 1/137 181/120 |
| 4,185,714 A | * | 1/1980 | Pascouet | F15C 1/22 181/115 |
| 4,196,788 A | * | 4/1980 | Sciard | G01V 1/133 181/118 |

(Continued)

FOREIGN PATENT DOCUMENTS

EP 0 380 022 A2 8/1990

OTHER PUBLICATIONS

European Search Report in corresponding European Patent Application No. EP 15 17 0232 dated Nov. 19, 2015.

*Primary Examiner* — Edgardo San Martin
(74) *Attorney, Agent, or Firm* — Patent Portfolio Builders PLLC

(57) ABSTRACT

Method, source and shuttle configured to generate acoustic waves under water. The shuttle includes a firing piston closing a firing chamber and contributing to holding the compressed gas, and a transitional region connected to the firing piston. The firing chamber and the transitional region define a most restrictive area through which the compressed gas is released toward the at least one exhaust port, the most restrictive area is substantially smooth while the movable shuttle moves toward the open position, and a profile of the transitional region is selected to reduce a high-frequency content of the acoustic waves.

20 Claims, 10 Drawing Sheets

(56) References Cited

U.S. PATENT DOCUMENTS

| | | | | |
|---|---|---|---|---|
| 4,234,052 A * | 11/1980 | Chelminski | ............ | G01V 1/137 181/111 |
| 4,594,697 A * | 6/1986 | Pascouet | ................ | G01V 1/133 124/71 |
| 4,603,409 A * | 7/1986 | Jaworski | ................ | G01V 1/133 181/120 |
| 4,712,202 A * | 12/1987 | Chelminski | ............ | G01V 1/137 181/118 |
| 4,713,800 A * | 12/1987 | Russell | .................. | G01V 1/137 181/118 |
| 4,718,045 A * | 1/1988 | Desler | .................... | G01V 1/137 181/110 |
| 4,733,382 A * | 3/1988 | Pascouet | ................ | G01V 1/133 124/71 |
| 4,753,316 A * | 6/1988 | Bouyoucos | ............ | G01V 1/133 181/115 |
| 4,754,443 A * | 6/1988 | Chelminski | ............ | G01V 1/137 15/406 |
| 4,779,245 A | 10/1988 | Chelminski | | |
| 4,885,727 A * | 12/1989 | Auger | .................... | G01V 1/137 181/120 |
| 5,018,115 A | 5/1991 | Pascouet | | |
| 5,144,596 A * | 9/1992 | Pascouet | ................ | G01V 1/387 181/120 |
| 5,420,829 A * | 5/1995 | Pascouet | ................ | G01V 1/137 181/115 |
| 5,646,909 A * | 7/1997 | Bouyoucos | ............ | G01V 1/137 181/115 |
| 5,646,910 A * | 7/1997 | Bouyoucos | ............ | G01V 1/137 181/115 |
| 7,321,527 B2 * | 1/2008 | Hopperstad | ............ | G01V 1/137 367/144 |
| 7,466,630 B2 * | 12/2008 | Vaage | .................... | G01V 1/137 367/144 |
| 2011/0032796 A1 * | 2/2011 | Fullerton | ................ | G01V 1/133 367/21 |
| 2012/0327742 A1 * | 12/2012 | Kusko | .................... | G01V 1/137 367/25 |
| 2015/0016219 A1 * | 1/2015 | Sautron | ................ | G01V 1/137 367/23 |

* cited by examiner

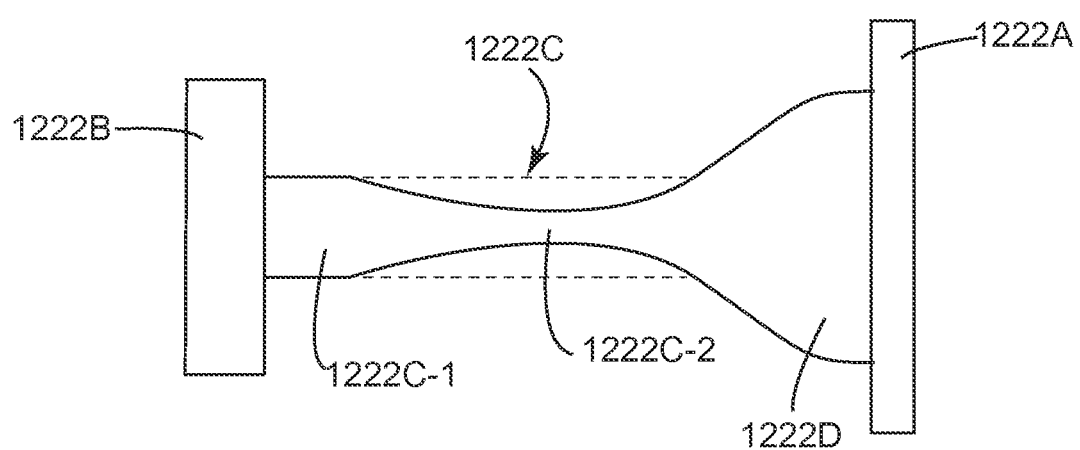

PNEUMATIC CONTROL FOR MARINE SEISMIC SOURCE AND METHOD

BACKGROUND

1. Technical Field

Embodiments of the subject matter disclosed herein generally relate to methods and systems and, more particularly, to mechanisms and techniques for controlling an output of a seismic source.

2. Discussion of the Background

Reflection seismology is a method of geophysical exploration to determine the properties of a portion of a subsurface layer in the earth, which information is especially helpful in the oil and gas industry. Marine reflection seismology is based on the use of a controlled source that sends energy waves into the earth. By measuring the time it takes for the reflections to come back to plural receivers, it is possible to estimate the depth and/or composition of the features causing such reflections. These features may be associated with subterranean hydrocarbon deposits.

For marine applications, sources are essentially impulsive (e.g., compressed air is suddenly allowed to expand). One of the most used sources are airguns which produce a high amount of acoustics energy over a short time. Such a source is towed by a vessel either at the water surface or at a certain depth. The acoustic waves from the airgun propagate in all directions. A commonly agreed useful frequency range of the emitted acoustic waves is between 6 and 300 Hz. However, the frequency content of the impulsive sources is not fully controllable and different sources are selected depending on the needs of a particular survey Thus, based at least on the above limitations of the existing sources there is a need to develop new sources that will eliminate or minimize their impact on the environment, also be more reliable, and have an extended lifetime. Accordingly, it would be desirable to provide systems and methods that overcome the afore-described problems and drawbacks.

SUMMARY

According to one embodiment, there is a seismic source configured to generate acoustic waves. The seismic source includes a housing having a firing chamber configured to hold compressed gas; a movable shuttle located inside the housing and configured to move between a closed position and an open position along a longitudinal axis of the housing; and at least one exhaust port configured to release the compressed gas into the ambient while the movable shuttle moves toward the open position. The movable shuttle includes a firing piston closing the firing chamber and contributing to holding the compressed gas, a transitional region connected to the firing piston, and a neck element connected to the firing piston or the transitional region. The firing chamber and the transitional region define a most restrictive area through which the compressed gas is released toward the at least one exhaust port, the most restrictive area is substantially smooth while the movable shuttle moves toward the open position, and a profile of the transitional region is selected to reduce a high-frequency content of the acoustic waves.

According to another embodiment, there is a seismic source configured to generate acoustic waves. The seismic source includes a housing having a firing chamber; a movable shuttle located inside the housing and configured to move between a closed position and an open position along a longitudinal axis of the housing; at least one exhaust port configured to release the compressed gas into the ambient while the movable shuttle moves toward the open position; and the movable shuttle has a transitional region that defines a most restrictive area through which the compressed gas is released toward the at least one exhaust port. The most restrictive area is substantially smooth while the movable shuttle moves toward the open position.

According to still another embodiment, there is a movable shuttle for a seismic source configured to generate acoustic waves. The movable shuttle includes a firing piston; a transitional region connected to the firing piston; and a neck element. A firing chamber of the seismic source and the transitional region define a most restrictive area through which compressed gas is released from the firing chamber toward at least one exhaust port, a profile of the transitional region is selected to control at least one parameter of an acoustic signature of the seismic source.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 12 illustrates a shuttle having a neck element with variable diameter.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an airgun. However, the embodiments to be discussed next are not limited to the airgun, but may be applied to other structures configured to generate a wave having a controlled frequency range.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a movable shuttle for a seismic source configured to generate acoustic waves. The movable shuttle includes at least three elements: a firing piston (itself possibly made of several parts), a transitional region (one or several) connected to the firing piston, and a neck element. For this embodiment, a firing chamber of the seismic source and the transitional region define a most restrictive area through which compressed gas is released from the firing chamber toward at least one exhaust port, and the most restrictive area is substantially smooth while the movable shuttle moves toward an open position. The term "smooth" is defined for the purpose of this disclosure to mean that a function, e.g., in this case the area of the most restrictive area versus time, has a continuous first derivative along a length of each transitional region.

Figure 1:
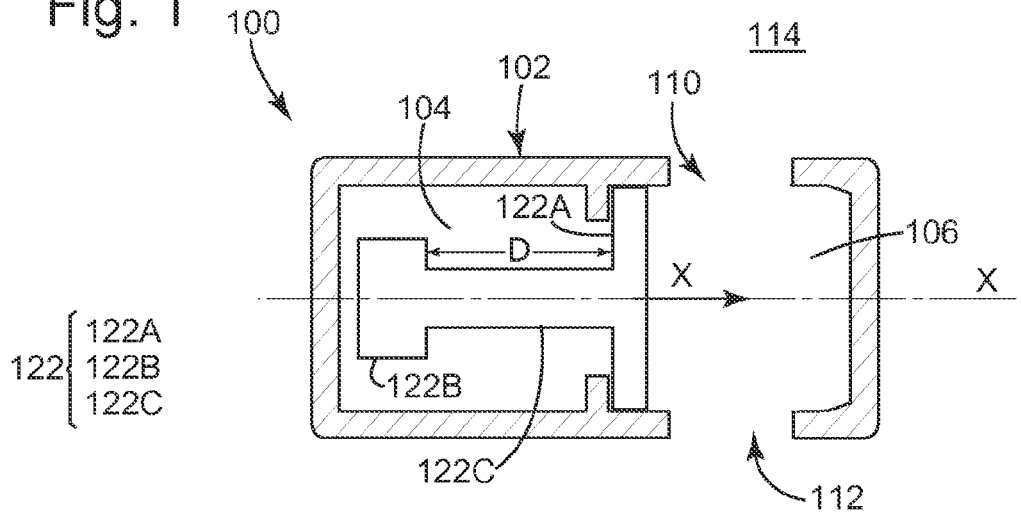
FIGS. 1-3 are schematic diagrams of a seismic source in various positions.

An example of an airgun 100 is shown in FIG. 1 and includes a housing 102 split into a pneumatic chamber (also hereafter called "firing chamber") 104 and a hydraulic chamber 106. Firing chamber 104 is configured to contain a compressed gas volume that can be released into the water through exhaust ports 110 and 112 communicating with the surrounding water 114. Note that the figures show only two ports for simplicity. Those skilled in the art would recognize that more or fewer ports may be used.

Exhaust ports 110 and 112 are holes made in housing 102 through which the gas volume (also called "firing volume") is released from the firing chamber 104 into surrounding water 114 to create a bubble. Arrows 120 in FIGS. 2 and 3 represent the gas volume released from the firing chamber 104.

The bubble creates an acoustic wave, also hereafter called acoustic signal. To contain the gas volume inside firing chamber 104, a movable shuttle 122 is located inside housing 102 and has at one end a firing piston 122A that closes firing chamber 104. At the other end, movable shuttle 122 has a return piston 122B. A neck element 122C extends from the firing piston 122A to the return piston 122B connecting the two together, as illustrated in FIG. 1 by arrow D. Firing piston 122A, neck 122C and return piston 122B form movable shuttle 122. Movable shuttle 122 is configured to move between two opposite positions along its translational axis X, namely, (i) a closed position as illustrated in FIG. 1, in which the compressed gas volume is contained within firing chamber 104, and (ii) an open position as illustrated in FIG. 3, in which the compressed gas volume is being released from firing chamber 104 through exhaust ports 110 and 112 into surrounding water 114, to generate the bubble.

Figure 2:
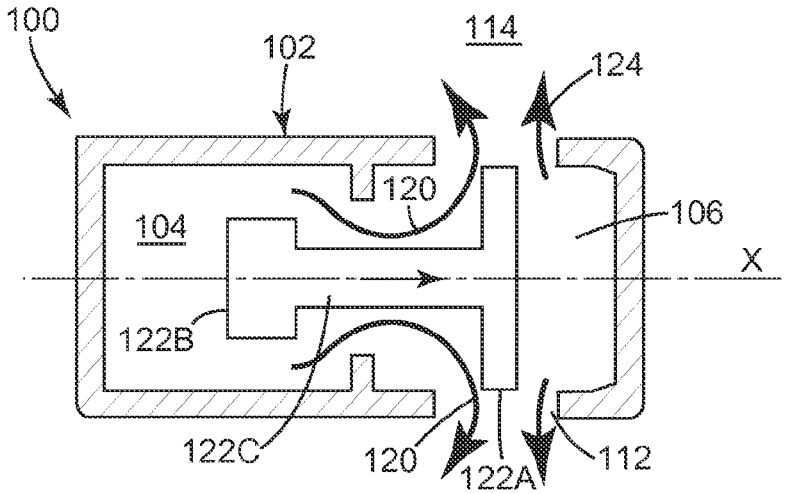
Figure 3:
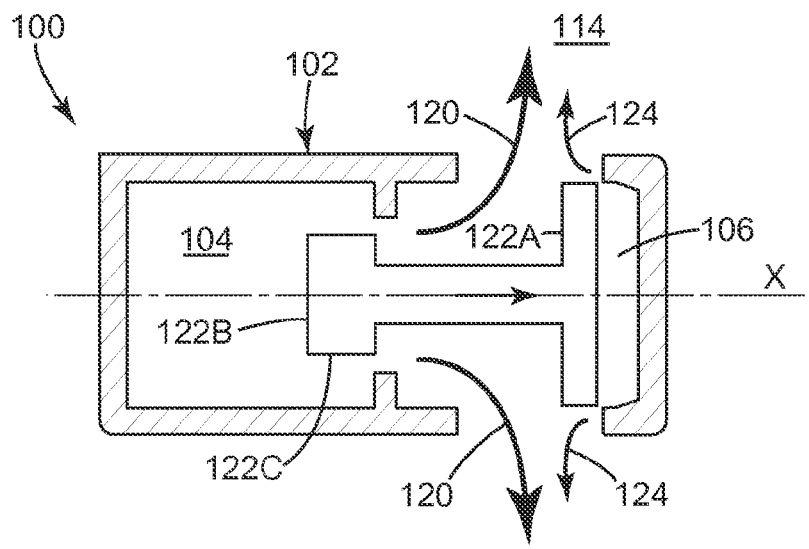

FIG. 2 shows movable shuttle 122 in an intermediate position in which firing piston 122A faces exhaust ports 110 and 112. Note that airgun 100 illustrated in FIGS. 1-3 has firing piston 122A closing firing chamber 104 in FIG. 1 in the closed position and reducing a volume of hydraulic chamber 106 at a minimum in FIG. 3 in the open position.

Hydraulic chamber 106 contains a volume of water when the airgun is surrounded by water. The volume of water is also expelled through exhaust ports 110 and 112, as indicated by arrows 124, when movable shuttle 122 moves toward the open position. The water volume may act as a brake on the shuttle, as disclosed in French Patent EP 13305989.

The phase during which the shuttle 122 moves between the closed and open positions is commonly referred to as "opening phase" or "firing phase" of the airgun. During this phase, shuttle 122 may acquire a high acceleration before uncovering exhaust ports 110 and 112. Once the firing phase has completed, i.e., the compressed gas volume has been released into water, shuttle 122 is returned to its closed position to seal firing chamber 104. In the embodiment shown in FIGS. 1-3, a solenoid (not shown) is used to actuate shuttle 122.

Figure 4:
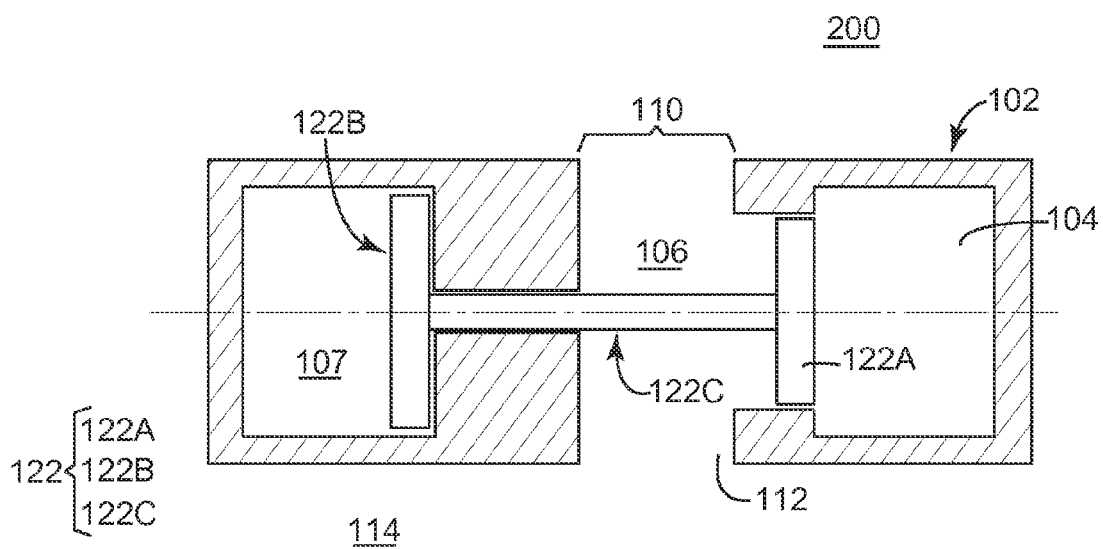
FIG. 4 is a schematic diagram of another seismic source.

In another embodiment illustrated in FIG. 4, airgun 200 has return piston 122B located within pneumatic return chamber 107 in such a way that return piston 122B cannot exit pneumatic return chamber while firing piston 122A moves inside firing chamber 104. Note that in this embodiment, the hydraulic chamber 106 is located between firing chamber 104 and pneumatic return chamber 107, around shuttle's neck 122C.

Figure 5A:
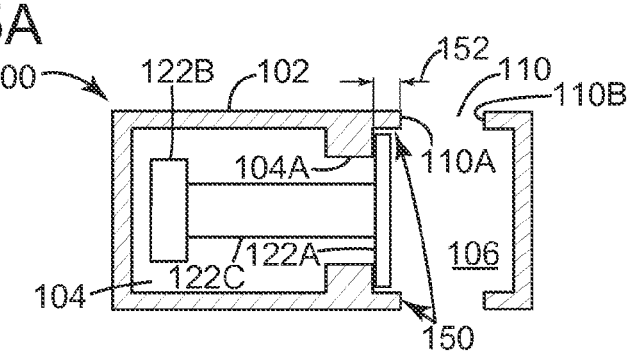
FIGS. 5A-C are schematic diagrams of the source of FIG. 1 and its various most restrictive regions.
Figure 5B:
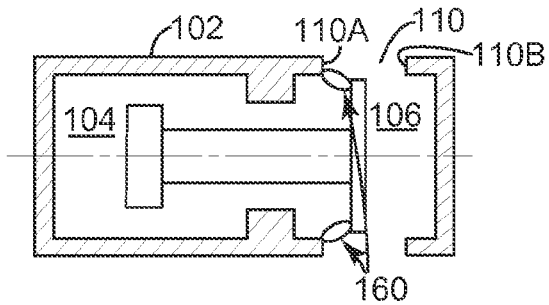
Figure 5C:
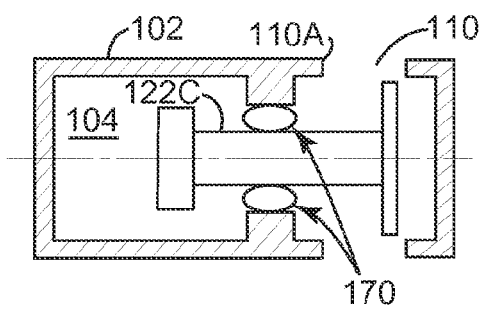

In either configuration (the one shown in FIG. 1 or the one shown in FIG. 4), there are two or three distinct functional regions that, according to these inventors, are responsible for most of the limitations experienced by traditional acoustic sources. These distinct functional regions are illustrated in FIGS. 5A-C for the airgun of FIG. 1 and in FIGS. 6A-B for the airgun of FIG. 4. Each functional region is defined by an area as now discussed.

Figure 6A:
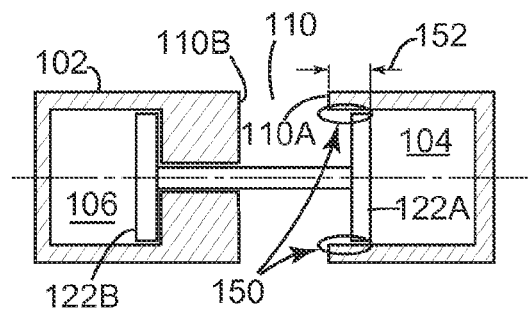
FIGS. 6A-B are schematic diagrams of the source of FIG. 4 and its various most restrictive regions.
Figure 6B:
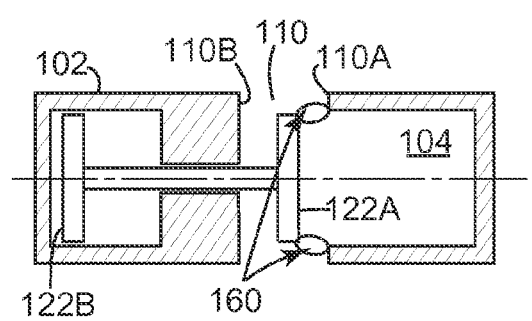
Figure 7:
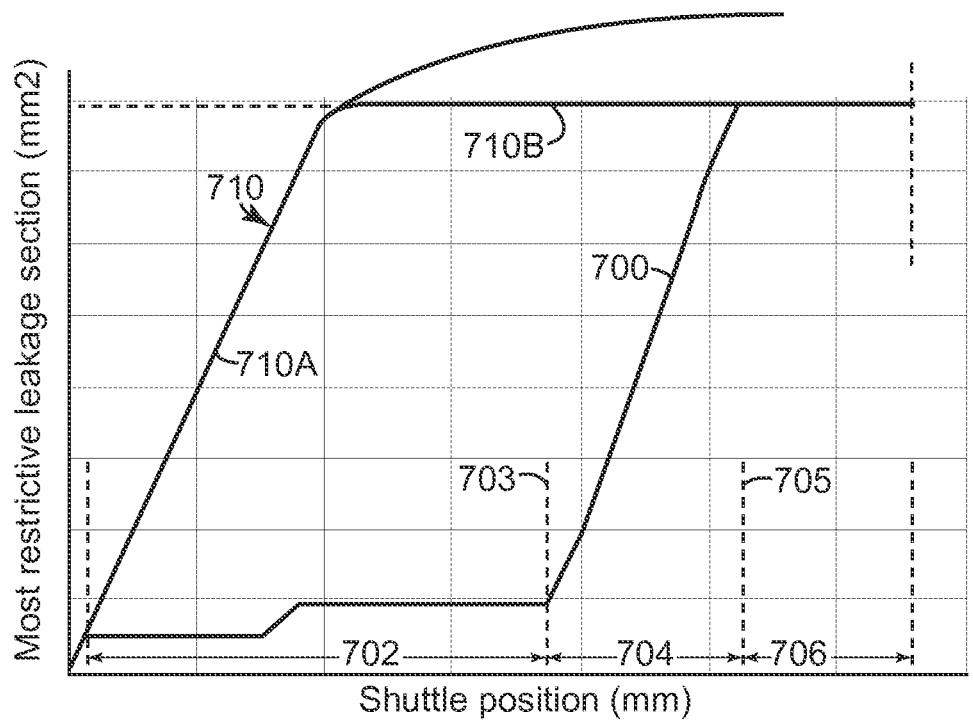
FIG. 7 illustrate the most restrictive area of the compressed air's escape path versus the shuttle's position.

FIGS. 5A and 6A show the first region, which is called the launching region 150, and this region extends from firing piston 122A to an inside of housing 102 (traditionally a liner is provided inside housing 102). Launching region has an annular shape, which is maintained while firing piston 122A moves, for example, from the closed position to an edge 110A of exhaust port 110. Note that an airgun may have one or more ports, but for simplicity, herein, the airguns are shown having two opposite ports. For the airgun shown in FIG. 1, the area of the launching region 150 increases in steps (i.e., with discontinuities) while firing piston moves from an end 104A of firing chamber 104 to the edge 110A of exhaust port 110. This discontinuity is shown in FIG. 7 along region 702. FIG. 7 plots the area of the most restrictive area versus shuttle's position. When initially actuated, firing piston 122A moves away from firing chamber 104, generating launching region 150, which is characterized by launching stroke 152. A length of launching stroke 152 varies from device to device. Also, two or more steps may be present along the launching stroke which make the launching region vary in a non-continuous way.

While firing piston 122A moves to generate launching region 150, pressurized air from firing chamber 104 starts to escape, thus initiating the bubble. Note that the compressed air escapes through launching region 150, which at this stage, is the most restrictive area along the escape path of the compressed air. Thus, launching region is responsible at this stage for most of the bubble's characteristics.

Once firing piston 122A has reached exhaust port 110's edge 110A, it generates the second functional region 160, which is also called the exhaust region. Exhaust region 160 is illustrated in FIG. 5B for the airgun of FIG. 1 and in FIG. 6B for the airgun of FIG. 4. Exhaust region 160 is characterized by firing piston 122A moving past exhaust port 110's edge 110A, toward its other edge 110B. At this time, more compressed air is escaping from firing chamber 104, thus increasing the size of the bubble. This exhaust region is now the most restrictive area along the escape path of the compressed air and thus, it is responsible for most of the bubble's characteristics. The transition from the launching region to the exhaust region introduces another discontinuity or step in the plot of the most restrictive area versus the shuttle's position, as illustrated in FIG. 7 at the transition between regions 702 and 704.

For the source of FIG. 1, a third region (also called the "neck region") is illustrated in FIG. 5C. Neck region 170 has an annular shape and is defined by neck 122C's outside surface and the inside surface (or liner) of firing chamber 104. Neck region 170 is now the most restrictive area along the escape path of the compressed air and thus, it is responsible for most of the bubble's characteristics. The transition from the exhaust region to neck region further introduces a step in the most restrictive area plot shown in FIG. 7, between regions 704 and 706.

For the conventional sources, the launching, exhaust and neck regions have different areas, which means that a step transition happens for the most restrictive area of the compressed air's escaped path when advancing from one region to the next one. FIG. 7 illustrates the step transition by plotting a line 700 that represents the most restrictive area ($mm^2$) versus shuttle position (mm) for a traditional source. The launching region 702, the exhaust region 704 and the neck region 706 are illustrated along axis X and transitions points 703 and 705 are clearly visible in the figure. These transition points (which are sharp) and others have been found by the present inventors to negatively impact the characteristics of the bubble, i.e., generate frequencies outside a range of interest, spread the bubble's energy onto unwanted frequencies, alter the shape of the pressure versus time and pressure versus shuttle position graphs, etc.

Thus, according to an embodiment, a source is designed such that its most restrictive area changes in a smooth way from one region to another region, thus, avoiding steep transitions, as illustrated by curve 710 in FIG. 7. In other words, according to an embodiment, the three functional regions described above with regard to FIGS. 5A-6B are merged into one or two functional areas that have substantially a smooth area during a large part of the shuttle's path. Note that shuttle's path is associated herein with the gas-release cycle, i.e., the duration during which the compressed air is released from the firing chamber. Thus, the most restrictive area is designed to reduce the high-frequency content of the acoustic waves generated by the source. According to an embodiment, the most restrictive area is defined only by (i) the firing chamber and (ii) the transitional region and/or the neck element. The shape of the transitional region is selected such that the most restrictive area is smooth and reduces the high-frequency content of the acoustic waves. In one application, the transitional region is designed so that the area of the exit port does not become the most restrictive area. This is true for this application even if the area of the exit port is just being created by the firing piston. In another application, the shape of the transitional region and/or neck portion are selected (or designed) to control the acoustic signature of the source. Thus, the peak, period, frequency, and other parameters that characterize the acoustic signature may be controlled by selecting the shuttle profile. These parameters are known in the art and one skilled in the art would know that the peak may be, for example, the maximum pressure increase when the bubble is created, the period may be, for example, the time between two consecutive peaks, and the frequency may be the inverse of the period. However, these definitions are not intended to be restrictive and those skilled in the art would recognize that alternative definitions for these parameters may be used in the field. Note that by selecting the appropriate shuttle profile (which includes the transitional region profile), one or more of these parameters of the acoustic signature may be controlled. The selection of the profile or shape may be achieved in various ways. For example, it is possible to use existing software packages that calculate the parameters of the acoustic signature for a given source and modify the profile/shape of the transitional region and/or neck element until a desired parameter of the acoustic signature is achieved. In another application, a shuttle is built having a given transitional region profile and the parameters of the acoustic signature are measured. If one or more of the parameters are not in the desired range, the transitional region and/or the neck element are modified (e.g., machined) to acquire another profile/shape and the parameters are again measured. This process may be repeated until the selected parameter(s) reaches the desired range. Thus, the selection process of the appropriate profile for the transitional region and/or neck element and/or other components of the source (e.g., exit port) may be implemented in a computer (if based on model calculations). However, it is noted that for controlling one or more parameters (e.g., high-frequency content) of the acoustic signature of a source, at least the profile/shape of the transitional region and/or neck element has to be selected as noted above. Thus, the meaning of the term "selected" in this context is understood to imply that at least one parameter of the acoustic signature is considered when choosing the shuttle. Contrary to this, mechanical considerations that normally are taken into account when designing a shuttle for a given source are not to be included under the term "selected" in this context.

A source having one or two functional regions is achieved, for example, by having the shuttle shaped to have a dedicated profile. In this way, the most restrictive area is substantially smooth while the shuttle moves from the closed position to the open position. By ensuring that the most restrictive area is substantially smooth during the shuttle's operation, there are fewer transitions and less sudden changes in the pressure generated for creating the bubble. Line 710 in FIG. 7 corresponds to the area of the most restrictive area as a function of the shuttle's position. Note that there is an increase of the most restrictive area from zero (when the shuttle is in the closed position and no compressed air is escaping from the firing chamber) to a given value A (when the shuttle has moved slightly from the closed position and compressed air starts to be released from the firing chamber) during a portion 710A of the curve, which corresponds to opening the firing chamber. However, during the next portion 710B of curve 710, the most restrictive area is substantially smooth as the shuttle continues to move to the open position. Portion 710B can have a substantially constant value A or its area may increase continuously as also shown in the figure. This smooth change in the most restrictive area is achieved by selecting the shuttle as will be discussed later. In one embodiment, portion 710A corresponds to less than a third of the shuttle's entire stroke, with portion 710B accounting for two thirds of the shuttle's entire stroke. The ratio of portion 710A to portion 710B (in terms of shuttle's stroke) may vary, for example, it may be less than ½.

Figure 8A:
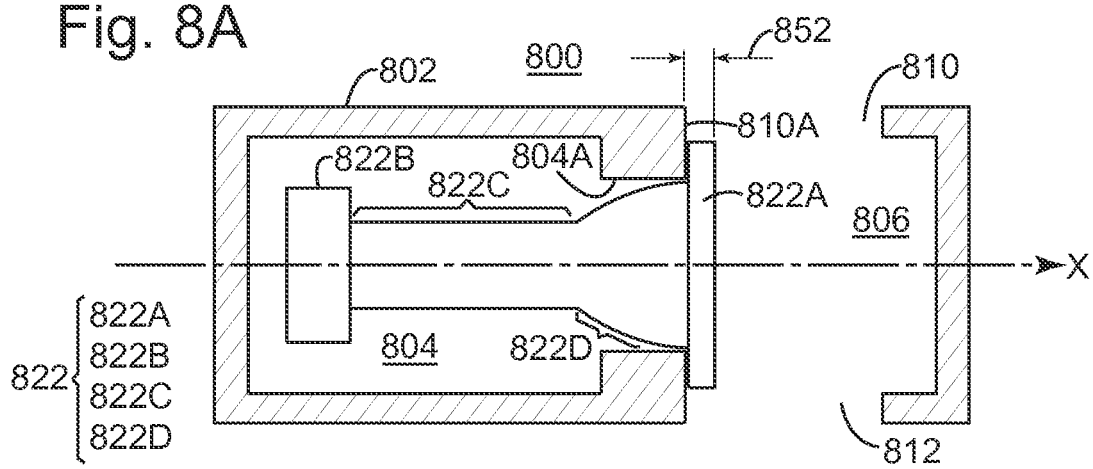
FIGS. 8A-C illustrate a source having a substantially constant most restrictive area according to an embodiment.
Figure 8B:
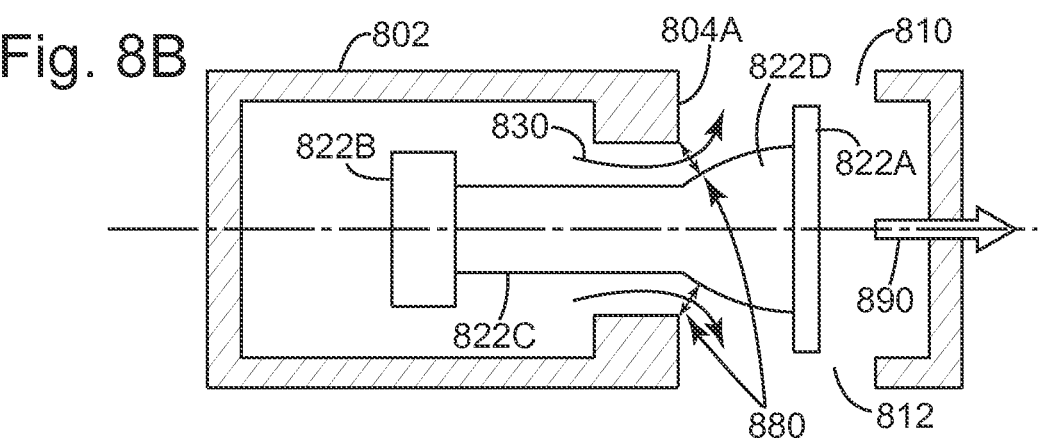
Figure 8C:
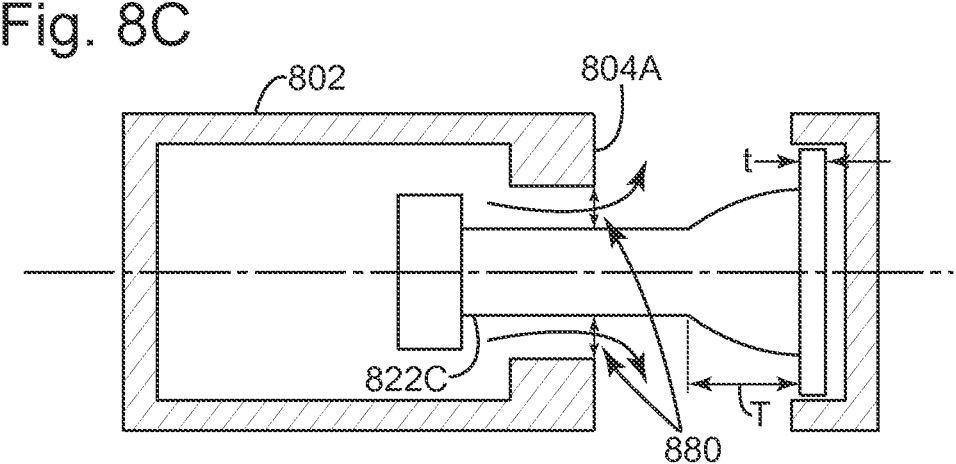

One source that achieves one or more of the advantages discussed above and has a substantially smooth most restrictive area is now discussed with regard to FIGS. 8A-C. Source 800 has a housing 802 that includes a firing chamber 804 and a hydraulic chamber 806. A movable shuttle 822 is located inside the housing. Movable shuttle 822 has a firing piston 822A at one end and a return piston 822B at the other end. Different from the existing sources, neck element 822C does not connect directly to firing piston 822A. A transitional region 822D makes the transition from neck element 822C to firing piston 822A.

Transitional region 822D is shaped such that, after firing piston 822A moves away from end 804A of firing chamber 804, as indicated by arrow 890 in FIG. 8B, the most restrictive area 880 remains substantially smooth while movable shuttle continues to move toward open position illustrated in FIG. 8C. In other words, most restrictive area 880 is substantially smooth either when this area is defined by end 804A and transitional region 822D (as shown in FIG. 8B) or when the annular area is defined by end 804A and neck element 822C (as shown in FIG. 8C). Arrows 830 in FIGS. 8B and 8C indicate the escape path of the compressed air from firing chamber 804. Note that the positions of the movable shuttle in FIGS. 8B and 8C correspond to region 710B of the most restrictive area versus shuttle position graph 710 shown in FIG. 7. Region 710A in FIG. 7 corresponds to the initial opening of the firing piston, when the most restrictive area increases, for a short period of time, from zero to value A. Value A may be adjusted for each source depending on its intended use. Note that transitional region 822D has a variable diameter along the longitudinal axis X. In one embodiment, the variable diameter continuously increases from the neck element toward the firing piston. In one application, the variable diameter increases with different rates along the longitudinal axis X. In one embodiment, the transition from transitional region 822D to neck element 822C is continuous (smooth) so even if the most restrictive area increases its value, the increase is smooth, without steps as in graph 700. A smooth transition may be considered when the first derivative of the transition's region contour is continuous. Note that this definition is understood to include some minor and/or discrete non-smooth regions that might be present in the graph 710 illustrated in FIG. 7. In one embodiment, a thickness t of the firing piston 822A is less than a thickness T of the transitional region 822D as illustrated in FIG. 8C. In another embodiment, the thickness T is at least twice the thickness t. By having the thickness T relatively large relative to thickness t, it is possible to make the transition from the firing piston to the neck element substantially smooth.

Once the movable shuttle has been designed and manufactured (i.e., has been selected) to generate the substantially constant more restrictive area 880, a source having such a shuttle will have no need for pneumatic control or a variable shape exhaust port 810 for controlling the shape and characteristics of its bubble. In this regard, note that patent U.S. Pat. No. 7,321,527 (herein the '527 patent, the entire content of which is incorporated herein by reference) proposes an airgun whose output acoustic signal is controlled by adjusting some of its pneumatic structural features, with the aim of reducing high-frequency range of acoustic signals. High-frequency signals are generally considered unwanted signals (i.e., noise) as they are outside of the frequency range usually used in marine seismic exploration. In addition, the high-frequency signals generate underwater noise pollution that may disrupt the marine wildlife. To meet this need, it is proposed in the '527 patent to configure the pneumatic chamber and/or pneumatic exhaust ports to adjust the gas rate released in water during the opening phase of the shuttle, so as to create a pneumatic exhaust area at a non-linear rate. However, a drawback of this known solution is that the range of modulation of acoustic signal is relatively limited. It further requires an accurate adjustment of the pneumatic structural features of the airgun, especially since the pneumatic forces that participate to the acoustic signal's creation are not easily controllable.

Thus, the solution proposed herein is more advantageous because it involves calculating the most restrictive area corresponding the firing piston's stroke, which is more accurate and predictable than determining the pneumatic forces as in the '527 patent. Further, such a movable shuttle as described herein may be used in existing sources without the need to redo the sources or add new components to them.

Figure 9A:
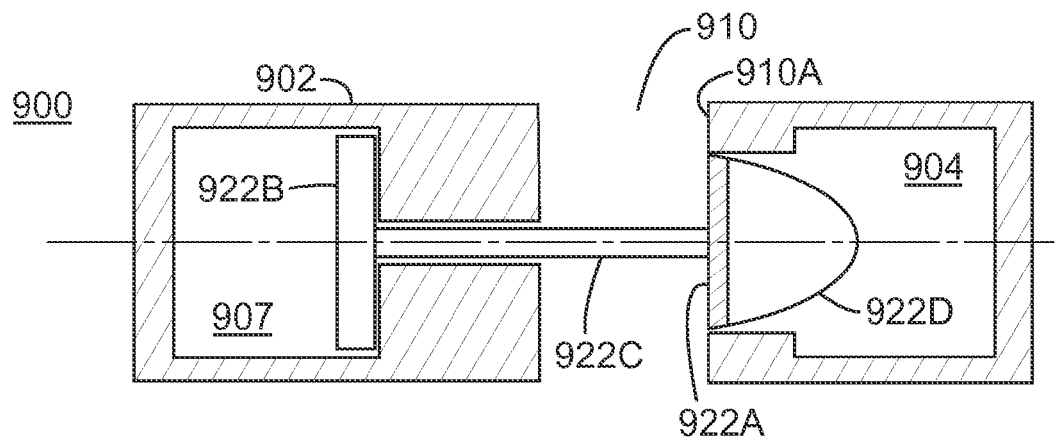
FIGS. 9A-C illustrate a source having a substantially constant most restrictive area according to another embodiment.
Figure 9B:
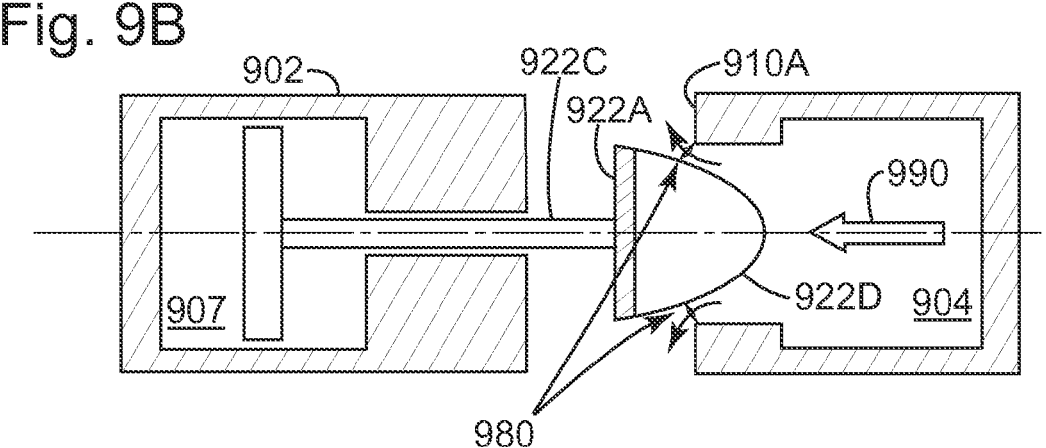
Figure 9C:
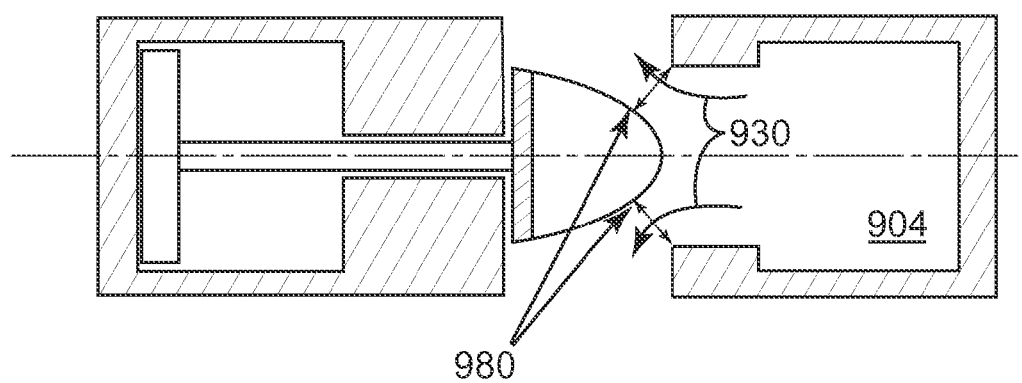

Another embodiment is illustrated in FIGS. 9A-C. Source 900 has transitional region 922D attached to firing piston 922A but not to neck element 922C. In other words, the firing piston is sandwiched between the transitional region 922D and neck element 922C. Firing piston 922A is shown in FIG. 9A in the closed position, i.e., closing firing chamber 904, moving away from firing chamber 904 in FIG. 9B as indicated by arrow 990, and in open position in FIG. 9C. Transitional region 922D is located inside firing chamber 904 when firing piston is in the closed position. Return piston 922B is located inside pneumatic chamber 907. Note that the most restrictive area 980 is, similar to the embodiment illustrated in FIGS. 8A-C, substantially smooth during most of the firing piston's stroke or increasing in a smooth manner (e.g., if the area versus time is plotted, the first derivative of this curve is substantially continuous).

In one embodiment, transitional region 922D is detachably attached to firing piston 922A. However, in another embodiment, the two elements are manufactured in an integral fashion, so that transitional region cannot be detached from the firing piston. In one application, both elements are made of the same material while in another the two are made of different materials, for example, the firing piston is made of a stronger material as it has to hold the compressed air inside firing chamber.

In the embodiments of FIGS. 8A-9C, it is noted that the traditional launching region is eliminated. The dedicated profile of the movable shuttle permits the most restrictive area between the shuttle and the liner of the housing (if one exists) to be substantially smooth as defined above, contrary to prior airguns where the most restrictive area is varying in steps between launching region, exhaust ports region and neck region.

Figure 10:
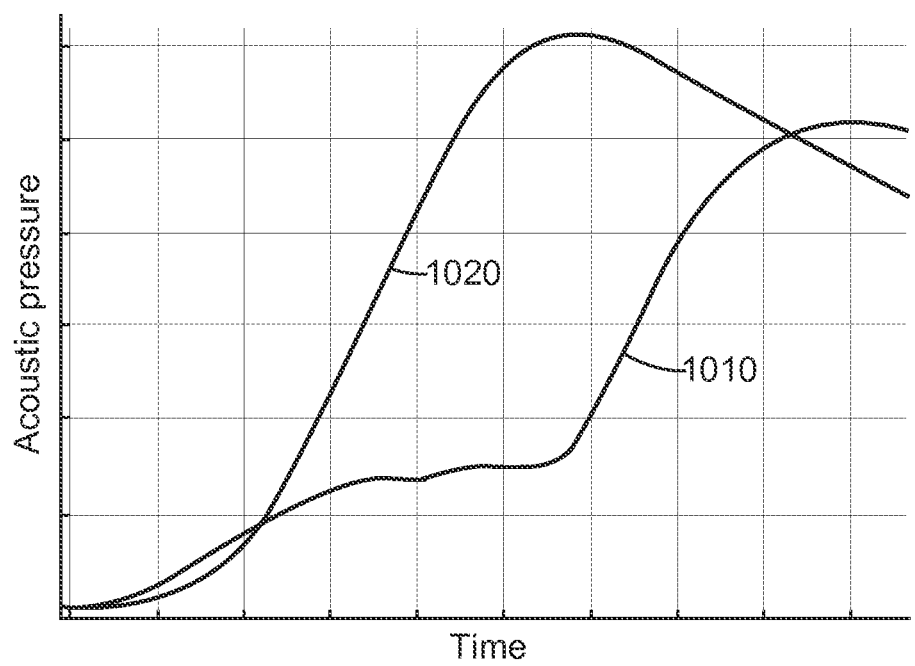
FIG. 10 illustrates the acoustic pressure versus time for a traditional source and a source according to one an embodiment.

Another characteristic of one or more embodiments discussed herein is related to the firing piston sitting directly on the edge 810A or 910A of the exhaust ports when the movable shuttle is in the closed position. In this way, there is no more launching region (or launching stroke 852 is eliminated). The disadvantage of having a launching region is that the corresponding gas release area is very small and constant. Removing this section and associated step has a positive impact on the generated acoustic signal because shuttle displacement and velocity are not any more controlled by the restriction associated with the launching region, so the beginning of the acoustic signal is tunable and not passively defined any longer. This advantage of one or more embodiments is illustrated in FIG. 10, which shows the graph 1010 of the near field acoustic pressure level versus time for a traditional source that has the launching region and also the graph 1020 of one of the sources discussed herein that does not have the launching region. By selecting an appropriate profile for the shuttle, various parameters of the bubble may be controlled.

One consequence of the sources discussed herein is their increase in efficiency, i.e., no pressure drop occurs before the bubble is being generated. Such a pressure drop in the traditional sources that had a preliminary leak due to the launching section resulted in a loss of energy, which negatively affected the bubble. However, the sources discussed herein may also be used with the launching section present.

Figure 11A:
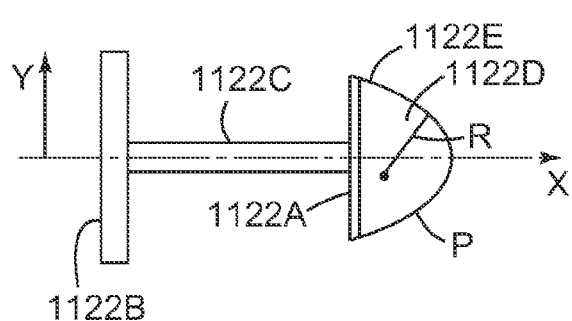
FIGS. 11A-F illustrate various profiles for a transitional region of a movable shuttle.

Those skilled in the art would recognize that other moveable shuttle shapes may be selected to achieve one or more of the advantages discussed above. For example, FIGS. 11A-C show various profiles for the exterior surface P of transitional regions 1122D. More specifically, FIG. 11A shows a convex transitional region (i.e., no angle of the polygon that fits the exterior of the transitional region is larger than 180°) while FIG. 11B shows a concave transitional region. FIG. 11C shows a convex transitional region having a larger radius R of curvature than the profile shown in FIG. 11A.

In other words, if the system of reference XY shown in FIG. 11A is used, the first derivative (or slope) of the surface 1122E of the transitional region 1122D, in the first quadrant, is negative and its absolute magnitude slowly increases while the same first derivative in the first quadrant for the surface 1122E in FIG. 11B, although negative, its absolute magnitude quickly increases and then slows down.

Figure 11D:
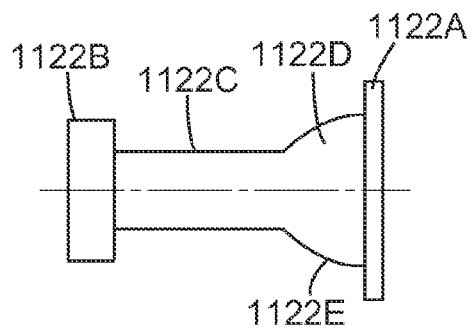
Figure 11B:
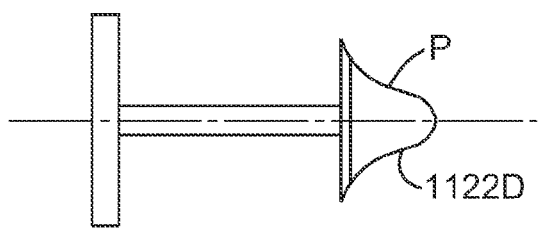
Figure 11E:
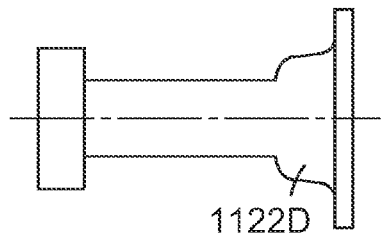
Figure 11C:
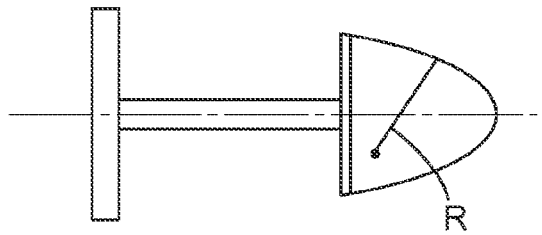
Figure 11F:
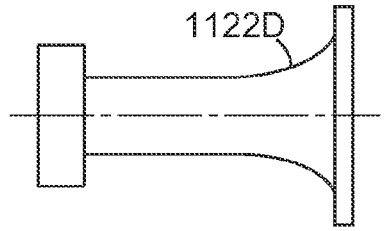

Similar to FIGS. 11A-C, the transitional region 1122D in FIGS. 11D-F is convex and makes a smooth transition between the neck element 1122C and the firing piston 1122A. FIG. 11D shows surface 1122E having a positive first derivative, FIG. 11E shows the same surface having a positive, steep first derivative followed by a positive, moderate (or slow) first derivative and then followed again by a steep first derivative. FIG. 11F shows surface 1122D having a substantially constant first derivative.

In one embodiment illustrated in FIG. 12, shuttle 1222 has a neck element 1222C having two regions, a first region 1222C-1 proximal to return piston 1222B having a constant diameter and a second region 1222C-2 proximal to transitional region 1222D or firing piston 1222A having a variable diameter. Second region 1222C-2's diameter is configured to match transitional region 1222D diameter. Note that a traditional neck element has a constant diameter along its longitudinal axis as illustrated by dash lines in FIG. 12. Those skilled in the art would note that various profiles are possible for neck element's second region 1222C-2 so that the most restrictive area is made even smoother while more air is released from firing chamber.

One advantage of one or more shuttle profiles illustrated in the above embodiments is the better control of gas flow (e.g., air flow) and consequently the control of acoustic signature. Controlling the acoustic signature means (i) increasing or decreasing the acoustic peak of the bubble and, thus, increased efficiency, (ii) the capability to control the acoustic frequency bandwidth, and/or (iii) the possibility to control acoustic frequency bandwidth to avoid unwanted high frequency signals, which is unnecessary for seismic acquisition and presumed better for mammals protection. To achieve one or more of these advantages, only the shuttle's profile needs to be tuned to define the most restrictive area.

Controlling air flow by shuttle's profile and not linear profile or ports exit area as in the '527 patent, also allows to limit body length, weight and thus cost, limit unwanted firing chamber pressure drop when opening and keeping the energy to maximize peak when shuttle is fully opened. The air flow control may also improve the shuttle's closing capability and decrease oscillations of the shuttle during closing because the variation of the most restrictive area is smoother and thus, the "damper effect" is much less important than in prior airguns.

The inventors have also noted that because shuttle oscillations are less important during a shot cycle, the wear of all shuttle's moving parts are reduced compared to prior airguns and the gun sensors output is possibly less jeopardized by these oscillations.

Figure 13:
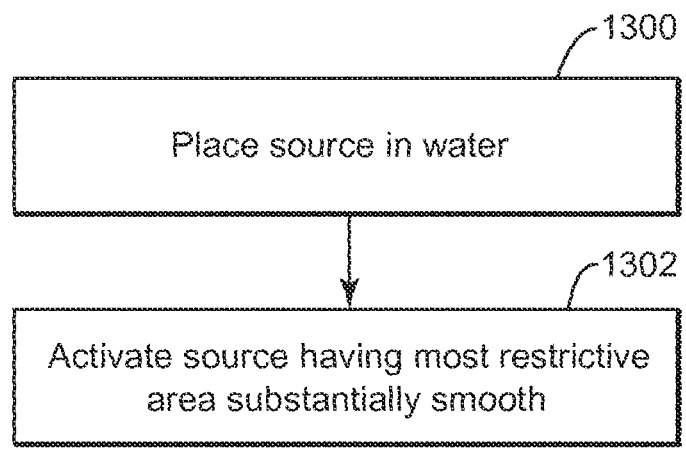
FIG. 13 is a flowchart of a method for using one of the sources discussed in the previous figures.

A method for operating a source as disclosed in any of the above-discussed embodiments is now illustrated in FIG. 13.

In step 1300, a source according to any of the above embodiments is placed in water and in step 1302 the source is activated to generate seismic waves. The bubble generated as a result of activating the seismic source has better characteristics than previous sources because the most restrictive area of the source is substantially constant or varies in a smooth way as discussed above.

The disclosed embodiments provide a source and a method for generating under sea acoustic waves with improved frequency spectrum. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:
1. A seismic source configured to generate acoustic waves, the seismic source comprising:
    a housing having a firing chamber configured to hold compressed gas;
    a movable shuttle located inside the housing and configured to move between a closed position and an open position along a longitudinal axis of the housing; and
    at least one exhaust port configured to release the compressed gas into the ambient while the movable shuttle moves toward the open position,
    wherein the movable shuttle includes:
    a firing piston closing the firing chamber and contributing to holding the compressed gas, and
    a transitional region connected to the firing piston, wherein the transitional region is located inside the firing chamber when the movable shuttle is in the closed position,
    wherein the firing chamber and the transitional region define a most restrictive area through which the compressed gas is released toward the at least one exhaust port to generate the acoustic waves, the most restrictive area is substantially smooth while the movable shuttle moves toward the open position, and a profile of the transitional region is selected to control at least one parameter of an acoustic signature of the seismic source, to reduce a high-frequency content of the acoustic waves.
2. The source of claim 1, wherein a thickness of the transitional region is larger than a thickness of the firing piston.

3. The source of claim 2, wherein the thickness of the transitional region is at least twice the thickness of the firing piston.

4. The source of claim 1, further comprising:
a neck element connected to the firing piston or the transitional region, the neck element having a variable diameter next to the transitional region.

5. The source of claim 4, wherein the transitional region is sandwiched between the neck element and the firing piston.

6. The source of claim 1, wherein the firing piston is located inside the firing chamber when the movable shuttle is in the closed position.

7. The source of claim 1, wherein the transitional region is selected to have a convex shape.

8. The source of claim 1, wherein an annular area between the transitional region and an end of the firing chamber is substantially equal to an annular area between the neck element and the end of the firing chamber.

9. The source of claim 1, wherein the firing piston directly faces the at least one exhaust port when in the closed position.

10. The source of claim 1, wherein the movable shuttle further comprises:
a neck element connected to the transitional region; and
a return piston connected to an end of the neck element, wherein the return piston is located inside the firing chamber.

11. The source of claim 1, further comprising:
a hydraulic chamber in fluid communication with the at least one exhaust port and the firing chamber when the movable shuttle is between the open and closed positions.

12. The source of claim 1, further comprising:
a neck element connected to the firing piston, wherein the transitional region and the neck element sandwich the firing piston.

13. The source of claim 1, wherein the movable shuttle further comprises:
a neck element connected to the firing piston; and
a return piston connected to an end of the neck element, wherein the return piston is located inside a pneumatic chamber.

14. A seismic source configured to generate acoustic waves, the seismic source comprising:
a housing having a firing chamber;
a movable shuttle located inside the housing and configured to move between a closed position and an open position along a longitudinal axis of the housing;
at least one exhaust port configured to release the compressed gas into the ambient while the movable shuttle moves toward the open position; and
the movable shuttle has a transitional region that defines a most restrictive area through which the compressed gas is released toward the at least one exhaust port to generate the acoustic waves, wherein the transitional region is located inside the firing chamber when the movable shuttle is in the closed position,
wherein the most restrictive area is substantially smooth while the movable shuttle moves toward the open position, and
wherein a profile of the transitional region is selected to control at least one parameter of an acoustic signature of the seismic source, to reduce a high-frequency content of the acoustic waves.

15. The source of claim 14, wherein the movable shuttle further comprises:
a firing piston closing the firing chamber and contributing to holding the compressed gas,
the transitional region is connected to the firing piston, and
a neck element configured to enter the firing chamber.

16. The source of claim 15, wherein the transitional region is sandwiched between the neck element and the firing piston.

17. The source of claim 14, wherein the firing piston is located inside the firing chamber when the movable shuttle is in the closed position.

18. The source of claim 14, wherein the transitional region has a first region with a variable diameter along the longitudinal axis and a second region with a constant diameter along the longitudinal axis.

19. The source of claim 18, wherein the variable diameter increases with different rates along the longitudinal axis.

20. A movable shuttle for a seismic source configured to generate acoustic waves, the movable shuttle comprising:
a firing piston; and
a transitional region connected to the firing piston;
wherein a firing chamber of the seismic source and the transitional region define a most restrictive area through which compressed gas is released from the firing chamber toward at least one exhaust port, a profile of the transitional region is selected to control at least one parameter of an acoustic signature of the seismic source, and the compressed gas released in ambient through the at least one exhaust port generates the acoustic waves.

* * * * *